(12) United States Patent
Haren et al.

(10) Patent No.: US 9,652,522 B2
(45) Date of Patent: May 16, 2017

(54) OBJECT NAMING

(71) Applicant: INTERNATIONAL BUSINESS MACHINES CORPORATION, Armonk, NY (US)

(72) Inventors: Pierre Haren, Sandy, UT (US); Nicolas C. Ke, Wissous (FR)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 14/090,541

(22) Filed: Nov. 26, 2013

(65) Prior Publication Data
US 2014/0195533 A1 Jul. 10, 2014

(30) Foreign Application Priority Data

Jan. 8, 2013 (GB) .................................. 1300255.5

(51) Int. Cl.
*G06F 7/00* (2006.01)
*G06F 17/30* (2006.01)

(52) U.S. Cl.
CPC .............................. *G06F 17/30595* (2013.01)

(58) Field of Classification Search
CPC ..................... G06F 17/30734; G06F 17/30607
USPC ......................................................... 707/736
See application file for complete search history.

(56) References Cited

U.S. PATENT DOCUMENTS

| | | | | |
|---|---|---|---|---|
| 5,680,616 | A * | 10/1997 | Williams | G06F 17/30607 707/796 |
| 5,873,092 | A * | 2/1999 | Cheng | G06F 17/30607 |
| 5,878,260 | A * | 3/1999 | Copeland | G06F 17/30607 717/108 |
| 5,893,913 | A * | 4/1999 | Brodsky | G06F 8/71 |
| 5,905,987 | A * | 5/1999 | Shutt | G06F 17/30607 707/792 |
| 6,620,204 | B1 * | 9/2003 | Malcolm | G06F 11/3664 714/38.11 |
| 7,353,237 | B2 * | 4/2008 | Birkenhauer | G06F 9/4428 |
| 7,818,428 | B1 | 10/2010 | Lavallee et al. | |
| 8,078,647 | B2 * | 12/2011 | Liang | G06F 17/30569 707/802 |
| 8,103,962 | B2 | 1/2012 | Embley et al. | |
| 8,161,371 | B2 * | 4/2012 | Baldwin | G06F 17/30091 707/796 |

(Continued)

OTHER PUBLICATIONS

V. Svatek et al., "Entity Naming in Semantic Web Ontologies: Design Patterns and Empirical Observations", University of Economics, Prague, Czech Republic, 2010, pp. 1-12.

(Continued)

*Primary Examiner* — Binh V Ho
(74) *Attorney, Agent, or Firm* — Law Office of Jim Boice

(57) ABSTRACT

A processor-implemented method, system, and/or computer program product names an object comprising a set of properties. One or more processors define a property as a name of the object, and then generate a name for the object with a naming scheme referring to properties of the object and connected objects. The processors store the generated name as part of the defined property. In response to the processors detecting changes in the referred properties and connected objects, the stored name is automatically updated according to the naming scheme.

18 Claims, 6 Drawing Sheets

(56) References Cited

U.S. PATENT DOCUMENTS

| | | | | |
|---|---|---|---|---|
| 8,225,221 | B2* | 7/2012 | Beran | G06F 17/30607 715/222 |
| 2004/0267567 | A1* | 12/2004 | Barrera | G06Q 10/02 705/2 |
| 2005/0228826 | A1* | 10/2005 | Beran | G06F 17/30607 |
| 2006/0026094 | A1* | 2/2006 | Oral | G06Q 40/025 705/38 |
| 2006/0075013 | A1 | 4/2006 | Hite et al. | |
| 2007/0027911 | A1 | 2/2007 | Hakala et al. | |
| 2007/0239471 | A1* | 10/2007 | Patton | G06F 21/629 726/30 |
| 2009/0030743 | A1* | 1/2009 | Tussy | G06Q 50/12 705/5 |
| 2010/0004959 | A1* | 1/2010 | Weingrad | G06Q 10/02 705/5 |
| 2010/0107059 | A1* | 4/2010 | Suzumura | G06F 17/22 715/239 |
| 2010/0121885 | A1* | 5/2010 | Hosomi | G06F 17/30734 707/794 |
| 2010/0287185 | A1* | 11/2010 | Cras | G06F 17/30439 707/769 |
| 2010/0299288 | A1 | 11/2010 | Gruber | |
| 2011/0099038 | A1* | 4/2011 | Nishida | G06Q 50/12 705/5 |
| 2011/0191273 | A1 | 8/2011 | Grabarnik et al. | |
| 2011/0288892 | A1* | 11/2011 | Desy | G06Q 10/02 705/5 |
| 2013/0262376 | A1* | 10/2013 | Spellman | G06F 17/30345 707/609 |
| 2013/0275446 | A1* | 10/2013 | Jain | G06F 17/2705 707/755 |
| 2014/0081678 | A1* | 3/2014 | Reynolds | G06Q 10/02 705/5 |
| 2014/0129264 | A1* | 5/2014 | Katagiri | G06Q 10/02 705/5 |

OTHER PUBLICATIONS

V. Svatek et al., "Ontology Naming Pattern Sauce for (Human and Computer) Gourmets", WOP, vol. 516 of Ceur Workshop Proceedings, 2009, pp. 171-178.

Anonymous, "JAVA.UTIL: Class Formatter", Oracle, 2010, Retrieved Nov. 26, 2013, pp. 1-33.

GB Application No. 1300255.5: UK IPO Search Report Mailed Jul. 5, 2013.

Anonymous, "Ontology (Information Science)", wikipedia.org, Wikimedia Foundation, Inc., Last Modified Oct. 4, 2013, Retrieved Oct. 8, 2013, pp. 1-9.

* cited by examiner

*32a*

| Hotel Reservation: | Guest Name XXXXX 2014-10-27 for 5 days | | |
|---|---|---|---|
| Hotel | XXXXX | | |
| Customer | Guest Name | | |
| Arriving On | 2014-10-27 | Leaving On | 2014-11-02 |
| Type of Room | Standard | | |
| Reservation Credit Card | Credit Card ending in XXXX Guest Name | | |
| Confirmation Number | S0209384 | | |
| Checking In? | ☑ | | |

| Room Selection: | Guest Name De Luxe (Room 223) 2014-10-27 |
|---|---|
| Selected Room | Room 223 |
| Possible Rooms | Room 223, Room 125 |
| Payment Planned with | Credit Card ending in XXXX Guest Name |
| Quoted Price in $ | $00.01 Upgrade? ☑ |

Room 223 Guest Name total bill $00.01 paid in full

| Charges | $00.01 |
|---|---|
| Bill Amount in $ | $00.01 |
| Payment Mode | Credit Card ending in XXXX Guest Name |
| Checking Out | ☑ |
| Paid in Full | ☑ |

FIG. 5

| Class | O | String Before | Expression | String After | F. | Skip if empty |
|---|---|---|---|---|---|---|
| HotelReservatio | 1 | | customer | | | |
| HotelReservatio | 2 | " " | hotel | | | TRUE |
| HotelReservatio | 3 | " " | arrivalDate | | | TRUE |
| HotelReservatio | 4 | " for " | numberOfDays() | " days" | | TRUE |
| CreditCard | 1 | | type | | | |
| CreditCard | 2 | " ending in " | last4Digits() | | | |
| CreditCard | 3 | " " | owner | | | TRUE |
| HotelBill | 1 | | roomSelection.selectedRoo | | | TRUE |
| HotelBill | 2 | " " | reservation.customer | | | |
| HotelBill | 3 | ", total bill $" | amount | " paid in full" | | TRUE |

FIG. 6

OBJECT NAMING

This application is based on and claims the benefit of priority from United Kingdom (GB) Patent Application 1300255.5, filed on Jan. 8, 2013, and herein incorporated by reference in its entirety.

BACKGROUND

This invention relates to a method of, and system for, naming an object. In a preferred embodiment, the invention provides a system and method to name ontological objects in conjunction with a rule engine.

Ontology is a mode of representation of domain knowledge and is used to build business applications in the companies, for various different purposes. Ontological based systems are more and more widely used and an ontology is considered a standard representation in many industries and businesses. Knowledge-based systems infer on the ontological objects, allowing them to evolve along with the inferences. The ontological objects are thus dynamically evolving in the course of a working session with users. Ontology can be considered a data model, with class hierarchies and slots, and constraints (type, cardinality, domain, etc.) on the slots.

Ontological objects are also handled and inferred by rules. Rules are the appropriate logic to drive the behaviour of objects, for example to keep their coherence and integrity. For example, an ontological object HouseForSale, which denotes a house for sale, could have the following properties (or slots): an address, a surface, an owner, a list of room descriptions, a price, a list of strengths (near the metro, 200 meters to the commerce, next to the school, etc.), a status (for sale, transaction in progress, sold) and so on. In this example, the house is the concept (the class) which has several associated properties (the slots). In a business application for the real estate agencies, a house (as an ontological object) will evolve following the interactions with the users of the real estate application. The description of the house can change; the price of the house can also change, as well as its status, etc.

In the same application, rules can be used to perform pattern matching between requests and houses for sale. Each available house could be matched to a request using rules and further qualified by a score, depending on, for example, fitness to the price and the other criteria. All this are better expressed by rules. As an ontological object is the basic constituent of an application, it is advisable to name an ontological object to provide it with a meaningful title. At present, there is no consistent way in which objects are named and this reduces their effectiveness and usability.

SUMMARY

In one embodiment of the present invention, a processor-implemented method, system, and/or computer program product names an object comprising a set of properties. One or more processors define a property as a name of the object, and then generate a name for the object with a naming scheme referring to properties of the object and connected objects. The processors store the generated name as part of the defined property. In response to the processors detecting changes in the referred properties and connected objects, the stored name is automatically updated according to the naming scheme.

BRIEF DESCRIPTION OF THE SEVERAL VIEWS OF THE DRAWINGS

Illustrative embodiments of the present invention will now be described, by way of example only, with reference to the following drawings, in which:

FIG. 5 is a screenshot of business application; and

FIG. 6 is a diagram of a second naming scheme in the form of a table.

DETAILED DESCRIPTION

Figure 1:
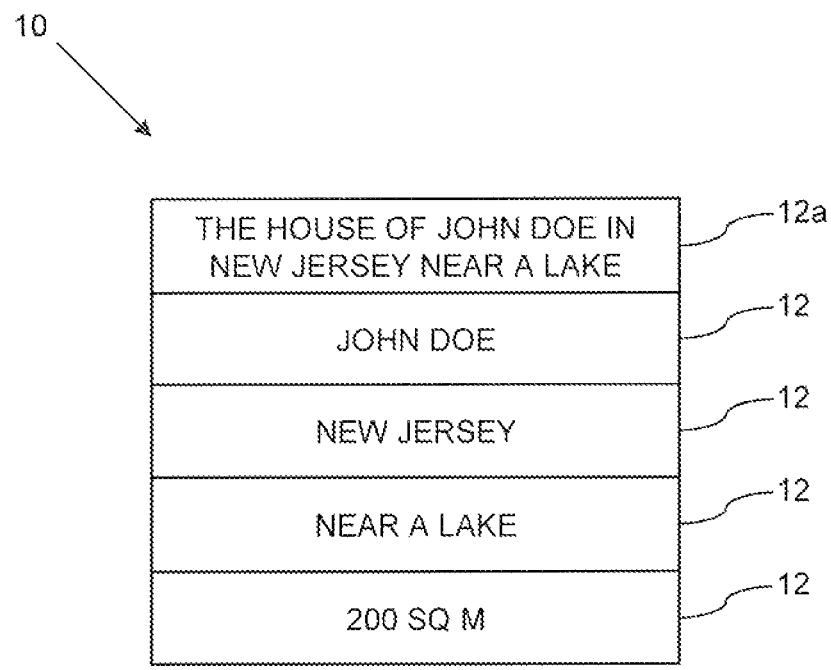
FIG. 1 is a schematic diagram of an object.

A business application based on ontology needs to name its objects accurately in order to be efficient and user friendly. For this, each ontological object 10, which comprises a set of properties 12 as shown in FIG. 1, has a property "name" 12*a*, created as a system-level slot. The name of the object is made of several elements: the values of its slots and/or the names of the other objects to which it points. For example, the name of a house (any house, not necessarily a house for sale) could be "the house of John Doe in New Jersey near a lake". Here the name depends on properties (slots) of the house (near a lake), the name of its owner (John Doe) and the name of its location (New Jersey).

When any of the depending elements change, the name of the house needs to be recomputed and updated. The new name is then stored in the slot of the object. In a business application based on ontology, the ontological objects evolve dynamically and are processed by rules. While it is relatively straightforward to perform the original formatting (or composition) of the names, it is a more complex matter to update the names, when the objects change. There is used a tabular form to describe the naming elements for each object (each class), a generic function to compute the name according to its name elements and a method and system to keep the names up to date when the depending elements change, in conjunction with a rule engine.

Existing methods provided by programming languages are function based and the names are computed when the functions are called, thus the names are not part of the object state. This code-based approach is not the most suitable for a knowledge-based application. In the approach described here, the object names are actively updated and are persisted as part of the object. More importantly, the names should provide a good summary of the object content, so the application user can quickly identify them. The updating of the object name ensures that any changes in important data is immediately reflected in a change in the object name and the user can often derive the information that they need about an object simply from looking at the title, rather than accessing the entire object.

A method and system are provided to dynamically compute and update the names of the ontological objects, while the objects evolve dynamically in a working session. The method provides a user-friendly way to specify the elements that compose a name in a tabular form (for example using a spreadsheet). The method is designed to work on the ontological objects in a rule engine, so that it works on the same objects as those in the rule engine, and is notified by the rule engine when the objects are created, modified and removed.

Figure 2:
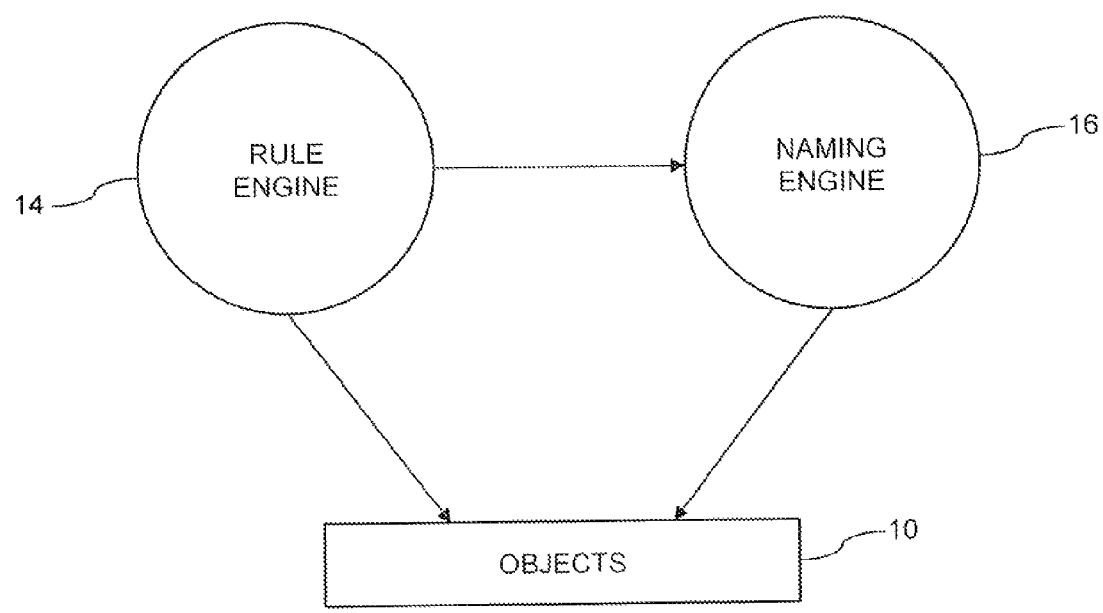
FIG. 2 is a schematic diagram of a rule engine, a naming engine and a set of objects.

FIG. 2 shows schematically the relationship between the objects 10, the rule engine 14 and a naming engine 16.

The method of naming an object 10 is carried out by the naming engine 16 and comprises the steps of defining a property as the name of the object, generating a name for the object with a naming scheme referring to properties of the object and/or connected objects, storing the generated name in the defined property, detecting one or more changes in the referred properties and/or connected objects, and updating the stored name according to the naming scheme. The object's name is constantly updated by the naming engine 16 whenever there is any change in a property or connected object that would result in a change in name according to the naming scheme used for the specific object.

The rule engine 14, which is governing the business application interaction with the objects 10, will notify the naming engine 16 any time that there is a change to a property of an object 10. The naming engine 16 runs the necessary logic to determine whether this will result in a change in the name of the specific object 10 that has changed and also whether any other objects need to have their name changed as a result. The naming engine 16 therefore receives updates from the rules engine 14, which may result in changes to one or more names of objects 10, including that of the object that changed.

Figure 3:
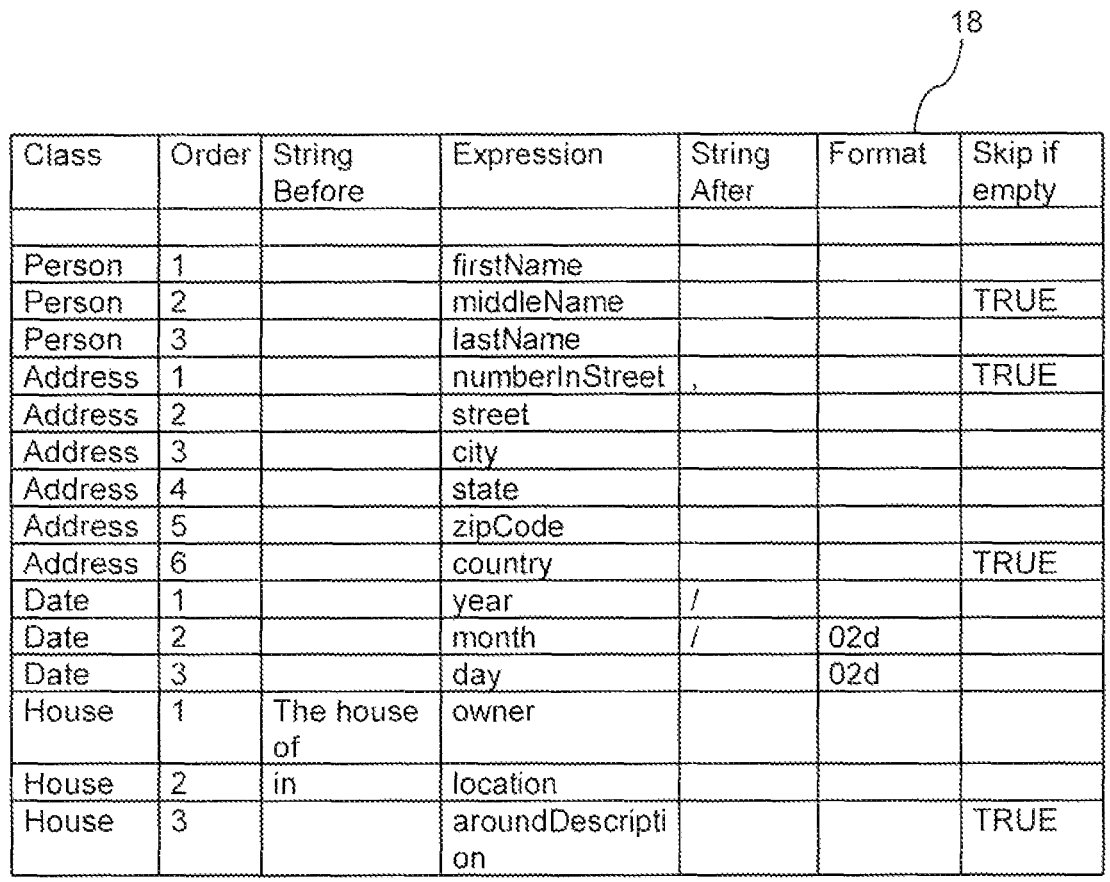
FIG. 3 is a diagram of a naming scheme in the form of a table.

The naming scheme used can use name elements which compose the names of the ontological objects, the elements being specified in a table 18, on a per-class basis, an example of which is shown in FIG. 3. This table provides the name elements for the classes Person, Address, Date and House.

The column class provides the class name. The column order is an integer and is used to sort the name elements in ascending order, to form an ordered list of name elements composing the name. For example for Person, the ordered list will be "firstName, middleName, lastName". For another country, it will be easy to reverse the lastName and firstName, only by changing the numbers in order. The String Before column contains a string which is appended to the name before the actual value. The column Expression contains an expression, which is generally a slot name of the current object. This expression can be made more complex to accommodate deeper object traversal. The String After column contains a string which is appended to the name, after the value of the expression. The Format column contains a Java-based format, which is used to print the expression value. This format covers situations like padding by 0 (see the name elements for Date), putting negative numbers within ( ), keeping a fixed number of decimals, printing currencies and so on. The Skip if empty column inform the naming engine 16 if the expression evaluates to empty, the name element is to be skipped. By default, this is false. If set to true, the engine will skip on an empty value.

The Expression can be of several forms. It can be:

A simple identifier representing a slot name of the current object.

If the above slot is an object, then the name of the object is automatically taken. For example, if "owner" is a slot of house and is an object, then the naming engine uses "owner.name" automatically.

An expression of the form slotName.length, where slotName is the name of a multi-valued slot of this object, to refer to the number of elements in this slot. For example "rooms.length" is the number of rooms of the current house, "rooms" being a slot of house.

An expression of the form slotName.N, where slotName is the name of a multi-valued slot of this object, to refer to the N-th element of the slot. "slotName.1" being the first element. For example, "rooms.1" and "rooms.2" represents respectively the first and the second element in the list of "rooms".

An expression composed of an identifier and followed by ( ) denotes a call to a function or method. A mechanism is put in place to allow the naming engine to invoke functions or methods. For example, the expression "getNumberOfYears( )" will invoke a function which computes the number of years for a house.

Composing the name of an object 10 is done using the steps of retrieving the list of name elements for the corresponding class, sorting the name elements in the increasing value of "order" and for each name element, evaluating the specified expression against the object. During the evaluation, if a different object is encountered, a dependency is created. If the evaluated value is empty, and if the "skip if empty" is true, then the name element is skipped, otherwise, append the "String Before", the value itself (printed using the provided format, if any), and "String After" and return the name.

Figure 4:
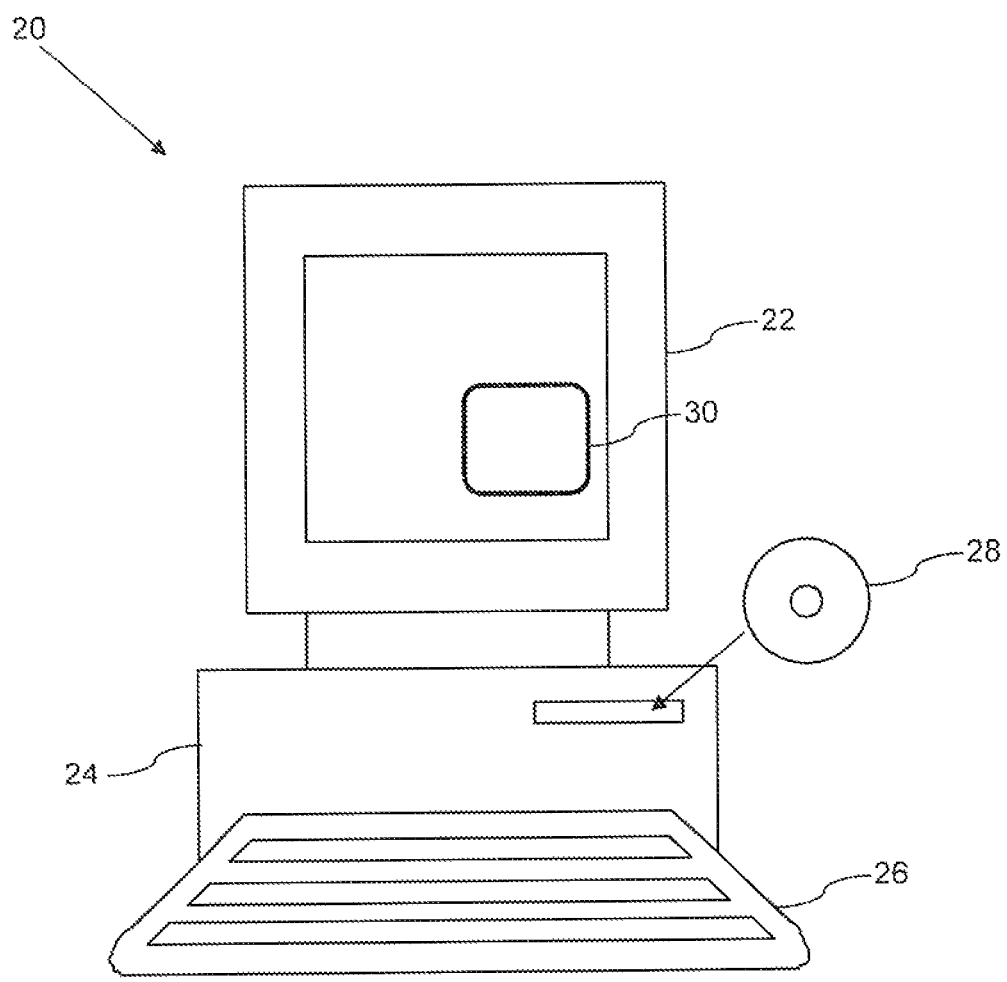
FIG. 4 is a schematic diagram of data processing system.

FIG. 4 illustrates a data processing device 20 which can be used to implement the rule engine 14 and the naming engine 16. The data processing device 20 comprises a display device 22, a processing device 24 and a user interface device 26. The processing device 24 is controlled by a computer program product stored on a computer readable medium 28, which comprises a CD-ROM. The computer program product 28 comprises instructions that are used to control the processor 24 which operates an embodiment of the naming system. The processor/processing device 24 also provides a GUI 30 to the naming system that can be accessed by a user, to modify naming schemes, for example.

The naming engine 16 is connected to the rule engine 14. The objects 10 in the ontology are processed by rules and the rule engine 14 keeps pointers to them. The rule engine 14 also creates, modifies and changes the objects 10. The naming engine 16 receives notifications from the rule engine 14. When an object O is created, then there is called a function updateName(object). The rule engine 14 notifies the naming engine 16. The naming engine 16 computes a name and assigns it to a slot within the new object O. During the computation of the name, if another object O' is read, a dependency is created, and so O' has O in its dependency list, so that when O' is modified, O will be recomputed.

When an object O is updated by the rule engine 14, then there is called a function updateName(object). A notification is sent to the naming engine 16. The naming engine 16 computes the new name. During the computation, the object's dependency list is reset and recomputed. The name is assigned and the rule engine 14 is informed of the name change. Each object in the dependency list of O receives a notification; this triggers the computation of the name. When an object O is removed by the rule engine 14, then a function call removeObject(object) is made and a notification is sent to the naming engine 16, which removes all the references to the removed object.

The methods (or functions) which are to be used for each of the operations referred to above are detailed below as pseudo-code. The first method composes a name for an object, and returns it. As a side effect, it updates the dependency list. Note that this method is recursive.

```
ComputeName (object, name elements)
Begin
    for each object which contains object is its dependency list
        remove object from the dependency list
    for each name element
        evaluate the expression
        for every O' read, create dependency O' ==> O
        if the value is empty and skip if empty is true, then go to next
        name element
        else
            append the string before text (if not empty)
            if format is provided
                then print the value using the format
                else print the value (without format)
            append the string after (if not empty)
    return the name
End
```

The second method updates a name for an object.

```
UpdateName (object)
Begin
    find the class of the object
    find the name elements for the class
    if the list of name elements is empty
    then
        return
    sort the name elements in ascending order of order slot
    let name = compute name (object, name elements)
    if the name equals to the name of object
    then
        return
    else
        assign the name to the object
        update the rule engine
        for each O' in the dependency list of O
            UpdateName(O')
End
```

This third method removes an object.

```
RemoveName (object)
Begin
    for each object which contains object is its dependency list
        remove object from the dependency list
End
```

In a hotel reservation application, objects such as hotel, customer, reservation, room selection, bill and credit card etc. have their names determined using the process described above. FIG. 5 shows a screen shot of such a hotel reservation application, with certain object names highlighted using a bold rectangle. In the user interface to the application, automatically computed names are surrounded in this way to illustrate the invention. The first rectangle 32a is the name of a reservation. This name is computed using the following data, which are the properties of the HotelReservation object: the customer, the hotel (requested by the customer), the arriving and departing date and a credit reservation, used at the reservation time. All these properties are themselves objects, so it is possible to consider a graph of objects:
  Customer has properties:
    First name
    Last name
  Hotel has properties
    The name of the hotel
  Etc.
Therefore, the name of the reservation is created from different information extracted from the sub-objects of a reservation. Here, the name for the current reservation is "Guest Name XXXXX Oct. 27, 2014 for 5 days". If the arriving date (Oct. 27, 2014) is changed, then this name ("Guest Name XXXXX Oct. 27, 2014 for 5 days") will be re-computed. If the departing date changes, the duration will be recomputed and the name will change and if the first name of the customer has changed (for example if the customer cedes the reservation to one person of his family), the reservation's name will also change.

FIG. 6 shows a table 18 that forms the naming scheme for three of the objects of the hotel reservation application, the HotelReservation object, the CreditCard object and the HotelBill object. From the table 18 of FIG. 6 it can be seen how a name for an object is generated which is then stored as a property of that object. This name will persist with the object as simple text and does need to be recalculated unless there is a change in any of the components (other properties or other sub-objects) that are used to generate the object name. At this point, the object name is recalculated and the name property of that object is updated.

As described herein, according to a first embodiment of the present invention, there is provided a method of naming an object comprising a set of properties, the method comprising the steps of defining a property as the name of the object, generating a name for the object with a naming scheme referring to properties of the object and/or connected objects, storing the generated name in the defined property, detecting one or more changes in the referred properties and/or connected objects, and updating the stored name according to the naming scheme.

As described herein, according to a second embodiment of the present invention, there is provided a system for naming an object comprising a set of properties, the system comprising a processor arranged to define a property as the name of the object, generate a name for the object with a naming scheme referring to properties of the object and/or connected objects, store the generated name in the defined property, detect one or more changes in the referred properties and/or connected objects, and update the stored name according to the naming scheme.

As described herein, according to a third embodiment of the present invention, there is provided a computer program product on a computer readable medium for of naming an object comprising a set of properties, the product comprising instructions for defining a property as the name of the object, generating a name for the object with a naming scheme referring to properties of the object and/or connected objects, storing the generated name in the defined property, detecting one or more changes in the referred properties and/or connected objects, and updating the stored name according to the naming scheme.

Owing to the invention, it is possible to provide a system and method for performing the naming of ontological objects that keeps the names updated when the ontological objects change. The names of ontological objects are kept as a normal property (slot) value in the objects and are updated when the depending variables or objects change. Such a system is data centric, and dissociates clearly the inference cycle (the moment where computations of values are performed) from the data persistence (objects are persisted coherently with all the necessary data for convenient use). For example, the name "House 4 rooms, 150 $m^2$, in Brooklyn, for sale for $420 000" is an easily understood and meaningful name (or title) for a house for sale. This name reflects accurately the content of the house (as an ontological object) exposed in a business application. When the object evolves and changes, the name will be updated accordingly. For example, this could happen when the price changes or when the list of strengths evolves. The naming methodology is also much easier for business users to access and use, since it is much simpler and does not require programming or other technical skills.

An ontology is often described graphically by people who are close to the business, who have low technical skills and do not need to distinguish between slots and methods. As a factual description of the domain's concepts, whenever a datum is needed, a slot is to be created. In other terms, the ontology creator expresses "I need a name, I need a total payment amount, I need an average discount", and it is at a further stage that these data are revealed to be derived from other objects. A system that is entirely knowledge based is more likely to be code-less, so that it exhibits the maximum of transparency of the application's logic. Methods necessarily imply code, while it is desirable to minimize the role of code. By the practice of separation of concerns, it is advisable that an ontological model be described solely according to the business domain, while another system is designed to take care of the integrity and coherence of the model. This later aspect is often linked to the business, there is often no predefined rules of integrity that can be written once and be hard-coded. For these reasons, in one or more embodiments of the present invention, the choice in the ontology authoring is to expose all the data of the domain, express the "rules" to derive or compute these data, and maintain a coherent model for convenient use (such as the GUI and reporting, etc.), rather than having to build a mix of data and methods.

In one embodiment of the present invention, the methodology further comprises determining a class for the object and selecting the naming scheme according to the determined class. Naming schemes can be generic for classes of objects so that a new object of a known class can have its name generated using a class-specific naming scheme, without the need for any user input to select the correct naming scheme. In the example of a house for sale given above, any new house for which a name will be required for the respective object can use a generic "house-for-sale" naming scheme, which will generate a name property for the new object using the contents of other properties of the object and/or any connected objects.

In one embodiment of the present invention, the methodology further comprises maintaining, for a specific object, a list of other objects whose naming schemes refer to the specific object. In order to simplify the process of updating names it is desirable to maintain a list, for each specific object, of those objects that refer to that specific object in their naming scheme. For example, in the "house-for-sale" naming scheme, a different object defining, for example, a local tax rate may be used to generate the name the house for sale. Should that local tax rate object change, this will result in the name of the house for sale also changing and therefore this process is simplified if a list of those objects that depend (for their names) off a specific object is maintained. In some sort, the system maintains a dependency list. When a name of an object changes, all the other names that use it are updated, and the process continues until all the names are updated.

In one embodiment of the present invention, the methodology further comprises providing a user interface to the naming scheme, receiving user input relating to the naming scheme and updating the naming scheme according to the received user input. Although naming schemes can be generated by people with a reasonable level of technical ability, it is desirable to create and provide access to a user interface that allows the naming scheme to be viewed graphically and adapted by anyone with a sufficient level of knowledge to understand the naming process. This provision of a graphical user interface allows users of the systems that manipulate and present objects to adjust and develop naming schemes that best suit their actual working practices.

In one embodiment of the present invention, the naming scheme comprises an ordered table of rows, each row comprising a property of the object or a reference to a connected object. By using a simple construct such as a table of ordered rows, then the naming scheme can be easily visualized and can also be easily worked on by a naming engine that will use the naming scheme to generate the names of objects. The rows of the table represent the properties and external objects that will be referred to in the creation of the name for an object. The ordered rows are intended to be worked on in turn in the actual process of naming an object.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   defining, by one or more processors, multiple properties to be used in a name of a database of the multiple properties of an object, wherein the name is non-executable text that describes the object, and wherein the object is a physical object;
   generating, by one or more processors, the name of the database by using a naming scheme, wherein the naming scheme uses descriptions of the multiple properties of the object, wherein the naming scheme comprises an ordered table of rows, wherein each row comprises a property of the object, wherein each property is from a plurality of properties of a class of the object, and wherein the name of the database includes terms that describe all of the multiple properties of the object;
   detecting, by one or more processors, one or more changes to one or more of the multiple properties of the object;
   in response to said detecting the one or more changes to one or more of the multiple properties of the object, automatically updating, by one or more processors, the name of the database with one or more terms that describe the one or more changes to one or more of the multiple properties of the object;
   sorting, by one or more processors, said each row according to an ordering of the plurality of properties for each class of the object;
   retrieving, by one or more processors, each row according to the ordering of the plurality of properties for each class of the object; and
   modifying, by one or more processors, the name of the database by sequentially using data from said each row according to the ordering of the plurality of properties for each class of the object.

2. The method of claim 1, wherein the object is a building.

3. The method of claim 1, further comprising:
   displaying the updated name of the database on a video display, wherein the updated name describes said one or more changes to one or more of the multiple properties of the object.

4. The method of claim 1, further comprising:
   retrieving and executing, by one or more processors, a function that generates a term that describes one or more of the multiple properties of the object; and
   updating, by one or more processors, the name of the database using the term generated by the function that is retrieved and executed by the one or more processors.

5. The method of claim 1, further comprising:
   executing, by one or more processors, a function call that retrieves one or more of the multiple properties of the object; and
   modifying, by one or more processors, the name of the database by changing a term in the name that described one or more of the multiple properties of the object that is changed by the function call.

6. The method according to claim 1, further comprising:
   maintaining, by one or more processors and for a specific object, a list of other objects whose naming schemes refer to the specific object.

7. The method of claim 1, further comprising:
   providing, by one or more processors, a user interface to the naming scheme;

receiving, by one or more processors, a user input relating to the naming scheme; and updating, by one or more processors, the naming scheme according to the received user input.

8. The method of claim 1, wherein the name provides a summary of the multiple properties of the object, wherein the summary enables a user to selectively retrieve the database of the multiple properties of the object.

9. A computer program product comprising one or more non-transitory computer readable storage mediums and program instructions stored on at least one of the one or more non-transitory storage mediums, the stored program instructions comprising:

program instructions to define multiple properties to be used in a name of a database of the multiple properties of an object, wherein the name is non-executable text that describes the object, and wherein the object is a physical object;

program instructions to generate the name of the database by using a naming scheme, wherein the naming scheme uses descriptions of the multiple properties of the object, wherein the naming scheme comprises an ordered table of rows, wherein each row comprises a property of the object, wherein each property is from a plurality of properties of a class of the object, and wherein the name of the database includes terms that describe the multiple properties of the object;

program instructions to detect one or more changes to one or more of the multiple properties of the object;

program instructions to, in response to detecting the one or more changes to one or more of the multiple properties of the object, automatically update the name of the database with one or more terms that describe the one or more changes to one or more of the multiple properties of the object;

program instructions to sort said each row according to an ordering of the plurality of properties for each class of the object;

program instructions to retrieve each row according to the ordering of the plurality of properties for each class of the object; and program instructions to modify the name of the database by sequentially using data from said each row according to the ordering of the plurality of properties for each class of the object.

10. The computer program product of claim 9, wherein the object is a building.

11. The computer program product of claim 9, further comprising:

program instructions to display the updated name of the database on a video display, wherein the updated name describes said one or more changes to one or more of the multiple properties of the object.

12. The computer program product of claim 9, further comprising:

program instructions to retrieve and execute a function that generates a term that describes one or more of the multiple properties of the object; and program instructions to update the name of the database using the term generated by the function that is retrieved and executed.

13. The computer program product of claim 9, further comprising:

program instructions to execute a function call that retrieves one or more of the multiple properties of the object; and program instructions to modify the name of the database by changing a term in the name that described one or more of the multiple properties of the object that is changed by the function call.

14. The computer program product of claim 9, further comprising:

program instructions to maintain, for a specific object, a list of other objects whose naming schemes refer to the specific object.

15. The computer program product of claim 9, further comprising:

program instructions to provide a user interface to the naming scheme;

program instructions to receive a user input relating to the naming scheme; and program instructions to update the naming scheme according to the received user input.

16. A computer system comprising one or more processors, one or more computer readable memories, one or more computer readable storage mediums, and program instructions stored on at least one of the one or more storage mediums for execution by at least one of the one or more processors via at least one of the one or more memories, the stored program instructions comprising:

program instructions to define multiple properties to be used in a name of a database of the multiple properties of an object, wherein the name is non-executable text that describes the object, and wherein the object is a physical object;

program instructions to generate the name of the database by using a naming scheme, wherein the naming scheme uses descriptions of the multiple properties of the object, wherein the naming scheme comprises an ordered table of rows, wherein each row comprises a property of the object, wherein each property is from a plurality of properties of a class of the object, and wherein the name of the database includes terms that describe the multiple properties of the object;

program instructions to detect one or more changes to one or more of the multiple properties of the object;

program instructions to, in response to detecting the one or more changes to one or more of the multiple properties of the object, automatically update the name of the database with one or more terms that describe the one or more changes to one or more of the multiple properties of the object;

program instructions to sort said each row according to an ordering of the plurality of properties for each class of the object;

program instructions to retrieve each row according to the ordering of the plurality of properties for each class of the object; and program instructions to modify the name of the database by sequentially using data from said each row according to the ordering of the plurality of properties for each class of the object.

17. The computer system of claim 16, wherein the object is a building.

18. The computer system of claim 17, further comprising:

program instructions to display the updated name of the database on a video display, wherein the updated name describes said one or more changes to one or more of the multiple properties of the object.

* * * * *